United States Patent
Miller, Jr.

(10) Patent No.: US 9,278,677 B2
(45) Date of Patent: Mar. 8, 2016

(54) SYSTEM AND METHOD FOR CONTROLLING RESPECTIVE BRAKING PRESSURES AT WHEELS ON A VEHICLE

(71) Applicant: Bendix Commercial Vehicle Systems LLC, Elyria, OH (US)

(72) Inventor: Thomas Stephen Miller, Jr., Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 44 days.

(21) Appl. No.: 13/967,097

(22) Filed: Aug. 14, 2013

(65) Prior Publication Data

US 2015/0051804 A1 Feb. 19, 2015

(51) Int. Cl.
| | |
|---|---|
| *B60T 11/10* | (2006.01) |
| *B60T 11/28* | (2006.01) |
| *B60T 15/02* | (2006.01) |
| *B60T 8/1764* | (2006.01) |
| *B60T 8/36* | (2006.01) |

(52) U.S. Cl.
CPC ............. *B60T 11/101* (2013.01); *B60T 8/1764* (2013.01); *B60T 8/361* (2013.01); *B60T 11/28* (2013.01); *B60T 15/028* (2013.01)

(58) Field of Classification Search
CPC ....... B60T 11/101; B60T 11/28; B60T 8/361; B60T 8/1764; B60T 15/028
See application file for complete search history.

(56) References Cited

U.S. PATENT DOCUMENTS

| | | | |
|---|---|---|---|
| 3,988,043 A | * | 10/1976 | Reinecke ..................... 303/160 |
| 4,755,945 A | | 7/1988 | Kade et al. |
| 4,763,260 A | | 8/1988 | Sakuma et al. |
| 4,807,944 A | | 2/1989 | Weise |
| 4,881,784 A | | 11/1989 | Leppek |
| 5,281,009 A | | 1/1994 | Kidston et al. |
| 5,375,919 A | | 12/1994 | Furuhashi |
| 5,538,334 A | | 7/1996 | Kushi et al. |
| 5,697,682 A | | 12/1997 | Watanabe et al. |
| 5,921,640 A | | 7/1999 | Mortimer et al. |

(Continued)

FOREIGN PATENT DOCUMENTS

| | | |
|---|---|---|
| DE | 4326040 A1 | 2/1994 |
| DE | 19504295 A1 | 8/1995 |

(Continued)

OTHER PUBLICATIONS

Bendix EC-60 ABS /ATC Controllers (Standard & Premium), Service Data Sheet SD-13-4863, BW2428, 2011.

(Continued)

*Primary Examiner* — Rodney Butler
(74) *Attorney, Agent, or Firm* — Brian E. Kondas; Cheryl L. Greenly; Eugene E. Clair (57) ABSTRACT

A controller controls respective braking pressures at wheels on a vehicle. The controller includes a processor electrically communicating with a first switching valve, which controls a first of the braking pressure at a first of the wheels, and a second switching valve, which controls a second of the braking pressures at a second of the wheels. The processor, during a braking control event, controls the switching valve associated with the higher of the braking pressures to maintain the higher braking pressure while switching a state of the switching valve associated with the lower of the braking pressures to increase the lower braking pressure.

34 Claims, 6 Drawing Sheets

(56) References Cited

U.S. PATENT DOCUMENTS

| | | | |
|---|---|---|---|
| 6,116,703 | A | 9/2000 | Breipohl et al. |
| 6,312,065 | B1 | 11/2001 | Freitag et al. |
| 6,349,789 | B1 | 2/2002 | Nakano et al. |
| 6,704,635 | B2 | 3/2004 | Walenty et al. |
| 8,276,993 | B2 | 10/2012 | Ripley et al. |
| 2001/0006306 | A1* | 7/2001 | Kagawa et al. ............... 303/20 |
| 2001/0038243 | A1 | 11/2001 | Isono |
| 2004/0192534 | A1 | 9/2004 | Nixon et al. |
| 2004/0227396 | A1 | 11/2004 | Kusano |
| 2005/0107940 | A1 | 5/2005 | Higuchi |
| 2005/0264104 | A1 | 12/2005 | Inoue et al. |
| 2007/0120418 | A1 | 5/2007 | Kajita et al. |
| 2008/0288148 | A1 | 11/2008 | Amato |
| 2010/0090058 | A1 | 4/2010 | Cahill et al. |
| 2012/0226402 | A1* | 9/2012 | Minamiura ............... 701/22 |
| 2013/0006476 | A1* | 1/2013 | Yamazaki ............... 701/42 |
| 2013/0226429 | A1 | 8/2013 | Udaka et al. |
| 2014/0180552 | A1 | 6/2014 | Giddens et al. |
| 2014/0188363 | A1 | 7/2014 | Eckert et al. |

FOREIGN PATENT DOCUMENTS

| | | |
|---|---|---|
| DE | 112011103701 T5 | 8/2013 |
| GB | 2196076 A | 4/1988 |
| GB | 2499438 A | 8/2013 |
| JP | H1120652 A | 1/1999 |

OTHER PUBLICATIONS

Office Action in related co-pending U.S. Appl. No. 14/459,549 issued Apr. 17, 2015.
Notification of Transmittal of The International Search Report and the Written Opinion of the International Searching Authority, or the Declaration for PCT/US2014/050039 (1 page), mailed Feb. 23, 2015.
International Search Report received with the Notification of Transmittal of The International Search Report and the Written Opinion of the International Searching Authority, or the Declaration for PCT/US2014/050039 (6 pages), mailed Feb. 23, 2015.
Written Opinion of the International Searching Authority received with The Notification of Transmittal of The International Search Report and The Written Opinion of the International Searching Authority, or the Declaration for PCT/US2014/050039 (7 pages), mailed Feb. 23, 2015.
Amendment in related co-pending U.S. Appl. No. 14/459,549, filed Jul. 17, 2015.
Notification of Transmittal of the International Search Report and the Written Opinion of the International Searching Authority, or the Declaration for counterpart International Appln. No. PCT/US2015/044566, mailed Oct. 21, 2015.
International Search Report for counterpart International Appln. No. PCT/US2015/044566, mailed Oct. 21, 2015.
Written Opinion of the International Searching Authority for counterpart International Appln. No. PCT/US2015/044566, mailed Oct. 21, 2015.
Office Action in related U.S. Appl. No. 14/459,549, dated Oct. 8, 2015.

\* cited by examiner

SYSTEM AND METHOD FOR CONTROLLING RESPECTIVE BRAKING PRESSURES AT WHEELS ON A VEHICLE

BACKGROUND

The present invention relates to a vehicle braking system. It finds particular application in conjunction with an anti-lock braking system and will be described with particular reference thereto. It will be appreciated, however, that the invention is also amenable to other applications.

Heavy vehicle braking systems commonly rely on compressed air for operating a vehicle braking system. Compressed air is produced by a compressor and stored in at least one reservoir. Various valves control fluid communication between the at least one reservoir and various brake circuits and individual brake chambers on respective wheels. Opening a valve from a reservoir to a brake circuit or a brake chamber increases the volume available for the compressed air stored in the reservoir. If an increased volume is available for the same amount of compressed air, the pressure of the compressed air in the increased volume drops.

In general, an anti-lock braking system (ABS) applies, holds, and releases pressure at an individual brake or multiple brakes to improve traction of the associated wheel and, furthermore, enhance vehicle control. Applying, holding, and releasing an individual brake is achieved by actuating and deactuating a valve associated with that brake. As discussed above, if the valve is in the apply state, the volume available for the compressed air increases, thereby decreasing the pressure in the reservoir. Decreased pressure in a brake circuit may impact the braking torque available to other brake chambers in the circuit.

The present invention provides a new and improved apparatus and method for addressing a decreased pressure available to brake chambers in a circuit when a valve to one of the brake chambers is in the apply state.

SUMMARY

In one embodiment, a controller controls respective braking pressures at wheels on a vehicle. The controller includes a processor electrically communicating with a first switching valve, which controls a first of the braking pressure at a first of the wheels, and a second switching valve, which controls a second of the braking pressures at a second of the wheels. The processor, during a braking control event, controls the switching valve associated with the higher of the braking pressures to maintain the higher braking pressure while switching a state of the switching valve associated with the lower of the braking pressures to increase the lower braking pressure.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
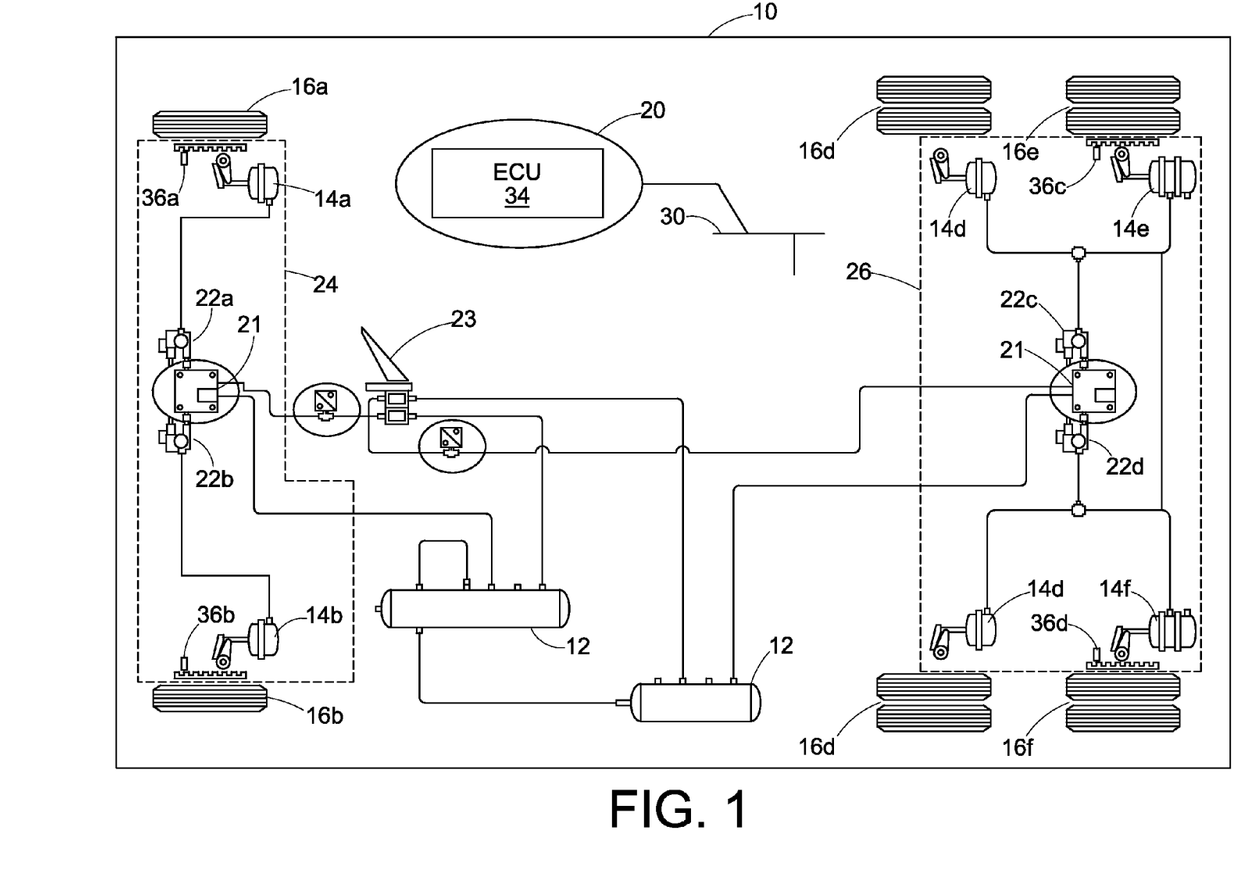
FIG. 1 illustrates a schematic representation of a vehicle including a braking system in accordance with one embodiment of an apparatus illustrating principles of the present invention.

With reference to FIG. 1, a simplified component diagram of a vehicle 10 including a compressed air braking system is illustrated in accordance with one embodiment of the present invention. The vehicle 10 includes reservoirs 12 that store compressed air for operating service brakes associated with respective brake chambers 14a, 14b, 14c, 14d, 14e, 14f (collectively, 14) on wheels 16a, 16b, 16c, 16d, 16e, 16f (collectively, 16) of the vehicle 10. A controller 20 controls delivery of the compressed air from the reservoirs 12 to the brake chambers 14 via switching valves 22a, 22b, 22c, 22d (collectively, 22) (e.g., solenoid valves) during an ABS event. The switching valves 22 are associated with the brake chambers 14 for applying and releasing the service brakes. In one embodiment, the switching valves 22 are normally open. In an ABS equipped system, the driver will first apply the service foot brake valve 23 which, in turn, opens relays valves 21 for transmitting compressed air to the switching valves 22. It will be appreciated by one skilled in the art that different methods of control of the compressed air to the brake chambers would be accomplished for a system equipped with a brake controller that can perform electronic stability program (ESP) or electronic braking system (EBS) control.

In the illustrated embodiment, the brake chambers 14a, 14b and respective switching valves 22a, 22b are in a first brake circuit 24. The brake chambers 14c, 14d, 14e, 14f and respective switching valves 22c, 22d are in a second brake circuit 26.

In one embodiment, the controller 20 electronically controls the compressed air delivered to the brake chambers 14a, 14b, 14c, 14d, 14e, 14f, for application of the service brakes during an ABS event, by electronically actuating the respective switching valves 22a, 22b, 22c, 22d. For example, the controller 20 transmits respective signals, via a vehicle communication bus 30, to set the respective switching valves 22 to one of i) an apply state, ii) a release state, and iii) a hold state. In the apply state, the switching valves 22 are normally open so that the brake chambers 14 fluidly communicate with the reservoirs 12. Therefore, in the apply state, the compressed air in the reservoirs 12 passes to the respective brake chambers 14 for applying the service brakes. In the release state, the switching valves 22 close so that the brake chambers 14 do not fluidly communicate with the reservoirs 12. Therefore, in the release state, the compressed air in the reservoirs 12 is prevented from reaching the respective brake chambers 14. At the same time, while in the release state, any compressed air currently in the respective brake chambers 14 is exhausted from the brake chambers 14 to atmosphere to release the service brakes. In the hold state, the switching valves 22 close so that the brake chambers 14 do not fluidly communicate with the reservoirs 12. Therefore, in the hold state, the compressed air in the reservoirs 12 is prevented from reaching the respective brake chambers 14. At the same time, while in the hold state, any compressed air currently in the respective brake chambers 14 is not exhausted from the brake chambers 14 and, instead, is held in the respective brake chambers 14 for maintaining application of the service brakes.

Although the illustrated embodiment shows the controller 20 transmitting signals to the switching valves 22 via the vehicle communication bus 30, other embodiments in which the controller 20 transmits signals directly to the switching valves 22 are also considered.

The controller 20 includes a communication port 32 and an electronic control unit (ECU) 34 (e.g., a processor). The communication port 32 electronically communicates with both the vehicle communication bus 30 and the ECU 34. In one embodiment, the ECU 34 is an anti-lock braking system (ABS) that controls the service brakes during an anti-lock braking event, by electronically actuating selected ones of the switching valves 22a, 22b, 22c, 22d of the respective brake chambers 14a, 14b, 14c, 14d, 14e, 14f to improve vehicle braking during certain conditions (e.g., when the wheels 16a, 16b, 16c, 16d, 16e, 16f slip during braking due to wet or icy road conditions).

Figure 2:
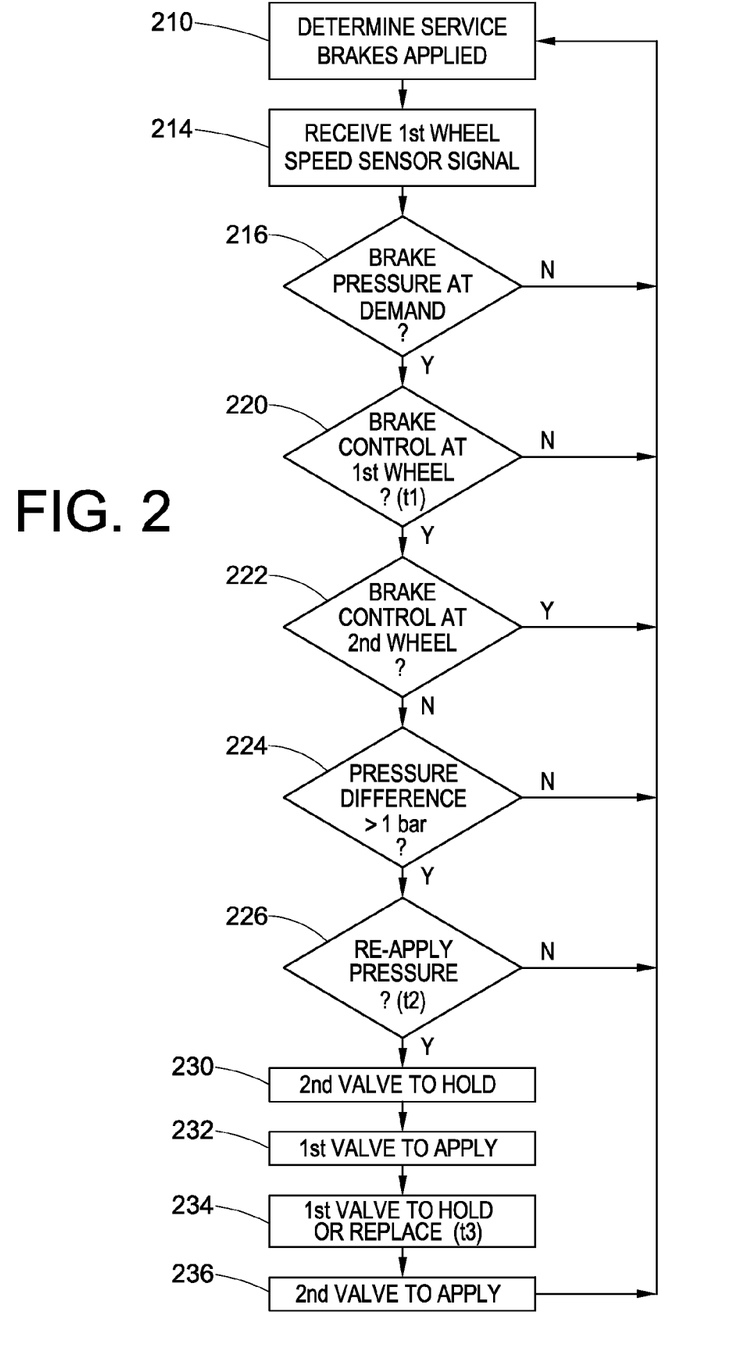
FIG. 2 is an exemplary methodology of controlling respective braking pressures at wheels on a vehicle in accordance with one embodiment illustrating principles of the present invention.

With reference to FIG. 2, an exemplary methodology of the system shown in FIG. 1 for controlling respective braking pressures is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

Figure 3:
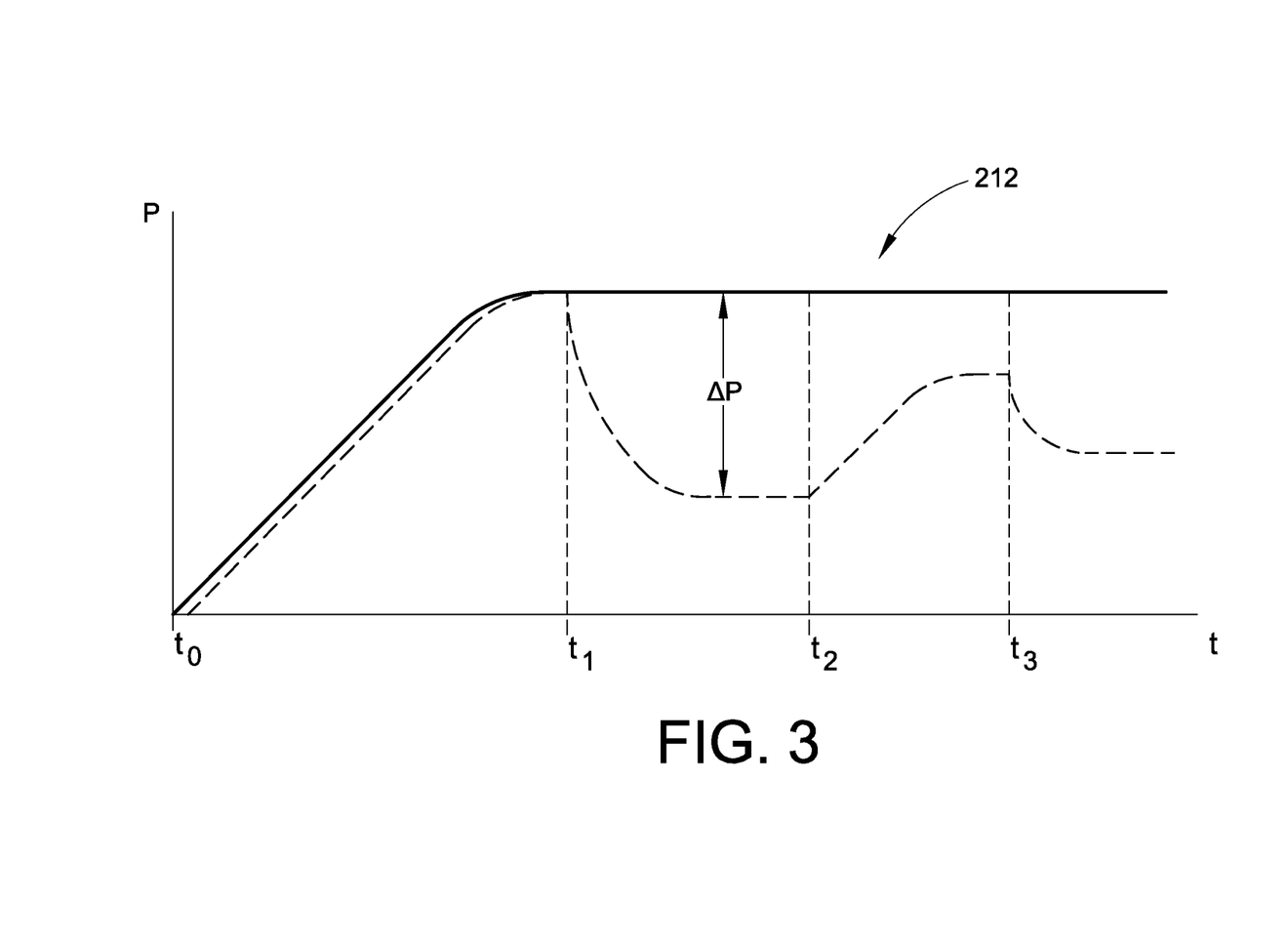
FIG. 3 illustrates a graphs of braking pressures versus time for two brake chambers in a circuit.

With reference to FIGS. 1 and 2, the controller 20 determines, in a step 210, that the vehicle service brakes are applied (see $t_0$ in FIG. 3). For example, the controller 20 determines that a vehicle operator has initiated a service brake application by depressing a pedal associated with the foot brake valve 23 and/or that the service brakes are automatically applied via, for example, ESP or EBS. At this stage, both the first and second valves 22a, 22b are in the apply state (e.g., normally open).

With reference to FIG. 3, graph 212 illustrates pressures in the first and second brake chambers 14a, 14b, respectively, versus time. In the graph 212, dashed lines represent the pressure in the first chamber 14a and solid lines represent the pressure in the second chamber 14b. The graph 212 shows that the pressures in the first and second brake chambers 14a, 14b, respectively, are substantially the same while both the first and second valves 22a, 22b are in the apply state (e.g., normally open), which is illustrated between time $t_0$ and time $t_1$. For illustration purposes, the dashed and solid lines in FIG. 3 are slightly offset from each other between the time $t_0$ and the time $t_1$.

With reference again to FIGS. 1 and 2, in a step 214, the controller 20 receives a first wheel speed sensor signal, from, for example, a first one of the wheel speed sensors 36a, which is associated with the wheel 16a. The first wheel speed sensor signal is transmitted to the ECU 34 (processor). In a step 216, the ECU 34 determines whether pressure in the service brake chambers 14a, 14b is at driver demand pressure. For example, the ECU 34 determines if the pressure in the service brake chambers 14a, 14b are at the expected pressure based on the pedal associated with the foot brake valve 23 being depressed by the vehicle operator and/or the service brakes being automatically applied via, for example, ESP or EBS. If it is determined in the step 216 that the pressure in the service brake chambers 14a, 14b are not at the expected pressure, control returns to the step 210.

Otherwise, if it is determined in the step 216 that the pressure in the service brake chambers 14a, 14b are at the expected pressure, control passes to a step 220 for determining if a brake control event is active at the first wheel 16a. If it is determined in the step 220 that a brake control event is not active at the first wheel 16a, control returns to the step 210. In one embodiment, if it is determined in the step 220 that a brake control event is active at the first wheel 16a, it is to be understood that the first valve 22a is in either the hold state or release state, and the second valve 22b is in the apply state (see $t_1$ in FIG. 3).

Then, in a step 222, the ECU 34 determines if a brake control event is active at the second wheel 16b. If it is determined in the step 222 that a brake control event is active at the second wheel 16b, control returns to the step 210. In one embodiment, if it is determined in the step 222 that a brake control event is not active at the second wheel 16b, it is to be understood that the first valve 22a is in either the hold state or release state, and the second valve 22b is in the apply state, which are the same states discussed above with reference to the step 220 when a brake control event is not active at the first wheel 16a.

With reference again to FIGS. 1 and 3, the graph 212 further illustrates pressures in the first and second brake chambers 14a, 14b, respectively, versus time. More specifically, the graph 212 shows that the pressure in the first brake chamber 14a becomes relatively lower than the pressure in the second brake chamber 14b after time $t_1$ when the first valve 22a transitions to the release state. The pressure in the second brake chamber 14b remains relatively higher than the pressure in the first brake chamber 14a after the time since the second valve 22b remains in the apply state.

With reference to FIGS. 1-3, if it is determined in the step 222 that a brake control event is not active at the second wheel 16b, control passes to a step 224 in which the ECU 34 determines if a pressure difference between two (2) brake chambers in a brake circuit is greater a predetermined pressure. In one embodiment, the predetermined pressure is about one (1) bar. For example, the ECU 34 determines if a pressure difference between the first and second brake chambers 14a, 14b in the brake circuit 24 is greater than the predetermined pressure. If it is determined in the step 224 that the pressure difference between the first and second brake chambers 14a, 14b in the brake circuit 24 is not greater than the predetermined pressure, control returns to the step 210.

If, on the other hand, it is determined in the step 224 that the pressure difference between the first and second brake chambers 14a, 14b in the brake circuit 24 is greater than the predetermined pressure (see $\Delta p$ in the graph 212), control passes to a step 226, in which the ECU 34 determines if pressure is to be re-applied to the first brake chamber 14a. The ECU 34 may determine that pressure is to be re-applied to the first brake 14a because, for example, of braking controlled by ABS, ESP, or EBS. If it is determined in the step 226 that pressure is not to be re-applied to the first brake chamber 14a, control returns to the step 210.

If, on the other hand, it is determined in the step 226 that pressure is to be re-applied to the first brake chamber 14a, the ECU 34 causes the second valve 22b to be transitioned to the hold state in a step 230 (at time $t_2$ in FIG. 3). Therefore, after step 230, the first valve 22a remains in either the hold state or the release state, and the second valve 22b is in the hold state. Then, in a step 232, the ECU 34 causes the first valve 22a to be transitioned from either the hold state or the release state to the apply state. Therefore, after step 232, the first valve 22a is in the apply state, and the second valve 22b is in the hold state. Optionally, the ECU 34 causes the first valve 22a to be transitioned to the apply state in the step 232 up to about 50 ms after the second valve 22b is transitioned to the hold state in the step 230.

With reference to FIGS. 1-3, the graph 212 further illustrates the first valve 22a is transitioned from the release state or the hold state to the apply state. Therefore, while the first valve 22a is in the release state or the hold state and the second valve 22b is in the apply state or hold state (e.g., between the time $t_1$ and the time $t_2$) the pressure in the first brake chamber 14a, which is represented by the dotted line, remains below the pressure in the second brake chamber 14b, Then, when the first valve 22a transitions to the apply state, (e.g., after the time $t_2$), the pressure in the first brake chamber 14a begins to rise (e.g., between the time $t_2$ and the time $t_3$ in FIG. 3).

After the step 232, control passes to a step 234 in which the ECU 34 sets the first valve 22a from the apply state to either the hold state or the release state (see the time $t_3$ in FIG. 3). Although it is contemplated that the first valve 22a may be set to either the hold state or the release state at the time $t_3$, the example illustrated in FIG. 3 shows the pressure in the first brake chamber 14a begins to drop after the time $t_3$. Therefore, FIG. 3 illustrates the embodiment in which the ECU 34 sets the first valve 22a from the apply state to the release state in the step 234.

Then, in a step 236, the ECU 34 sets the second valve 22b from the hold state to the apply state. Optionally, the ECU 34 causes the second valve 22b to be transitioned the apply state in the step 236 up to about 50 ms after the first valve 22a is transitioned to either the hold state or the release state in the step 234. In other words, the second valve 22b to be transitioned the apply state in the step 236 up to about 50 ms after the time $t_3$. Although the present embodiment is described as the ECU 34 setting the second valve 22b to the apply state up to about 50 ms after the time $t_3$, other embodiments in which the ECU 34 setting the second valve 22b to the apply state based on a pressure in the first brake chamber 14a (e.g., when the pressure in the first brake chamber 14a reaches about the same pressure as the second brake chamber 14b) are also contemplated.

Control then returns to the step 210.

As discussed in more detail below, in one embodiment, the step 232 occurs up to about 50 ms after the step 230. In addition, the step 236 occurs up to about 50 ms after the step 234.

The ECU 34 may act as a means for maintaining a higher braking pressure at the second brake while pressure increases at the first brake during a braking control event, if a braking pressure difference between the first and second brakes is greater than the predetermined threshold pressure. More specifically, the ECU 34 controls the first and second switching valves 22a, 22b as discussed herein to reduce pressure drops in the second brake chamber 14b when pressure is increased in the first brake chamber 14a due to a brake control event (e.g., ABS, ESP, or EBS).

Figure 4:
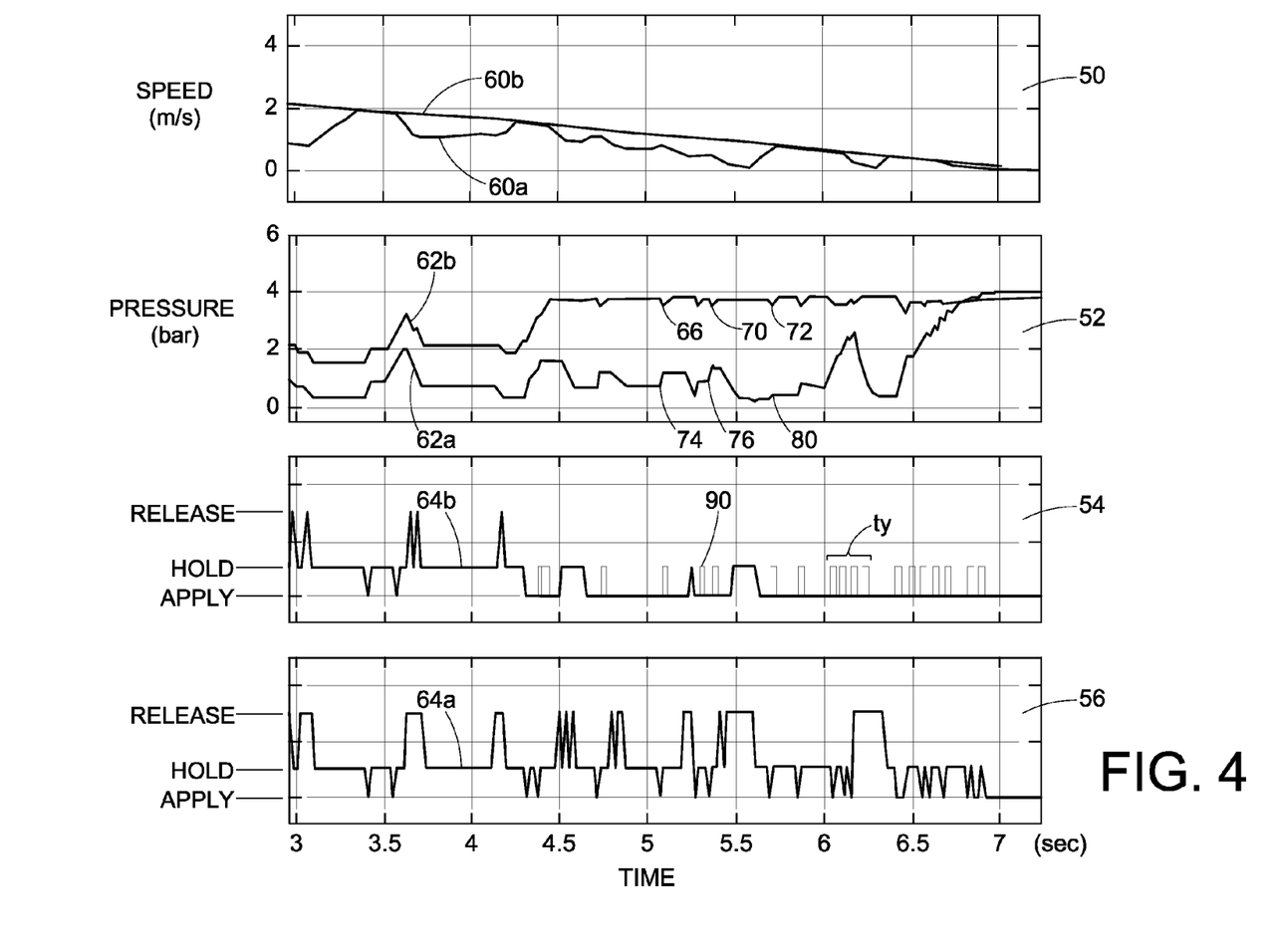
FIG. 4 illustrates various graphs for a system according to an embodiment of the present invention not including optional time between steps.

With reference to FIG. 4, three graphs 50, 52, and 56 representative of a system that does not employ the features of the embodiments described above for the present invention. The graph 50 illustrates speed versus time of the wheel 16a (see 60a) and the wheel 16b (see 60b). The graph 52 illustrates pressure versus time of the first brake chamber 14a (see 62a) and the second brake chamber 14b (see 62b). A graph 54 illustrates the states of the second valve 22b (see 64b). The graph 54 also illustrates a dotted line 90 representing how the states of the second switching device 22b are modified to include the hold states in the embodiments of the present invention. The graph 56 illustrates the states of the first valve 22a (see 64a). As illustrated in the graph 52, dips 66, 70, 72 in the line 62b, which represent dips in the pressure in the second brake chamber 14b, are evident at corresponding times when the line 62a rises 74, 76, 80, which represent pressure rises in the first brake chamber 14a.

Figure 5:
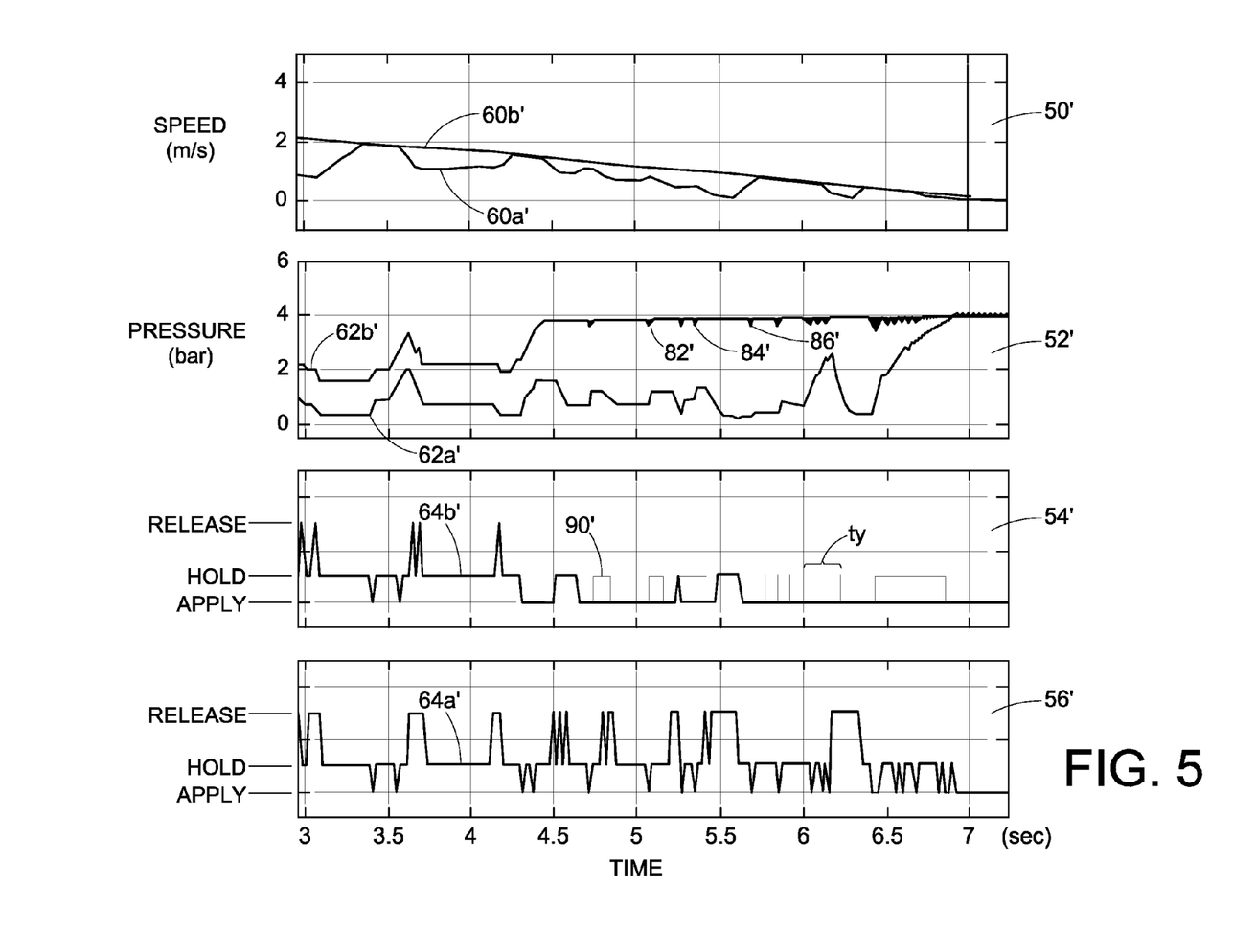
FIG. 5 illustrates various graphs for a system according to an embodiment of the present invention including optional time between steps.

FIG. 5 illustrates four graphs, which correspond to those illustrated in FIG. 4, representative of a system that does employ the features of the embodiments described above for the present invention. For ease of understanding FIG. 5, the corresponding graphs and other numerals in FIG. 4 are designated by like numerals with a primed (') suffix and new components are designated by new numerals.

With reference to FIGS. 4 and 5, the dips 66, 70, 72 illustrated in FIG. 4 are illustrated as filled portions 82', 84', 86' in FIG. 5. The filled portions 82', 84', 86' indicate the line 62b', which represents the pressure of the second brake chamber 14b, is relatively smoother than the line 62b (see FIG. 4), which represents torque gained in the second wheel 16b. The graph 54' (see FIG. 5) also illustrates a dotted line 90' representing how the states of the second switching device 22b are modified to include the hold states in the embodiments of the present invention.

Figure 6:
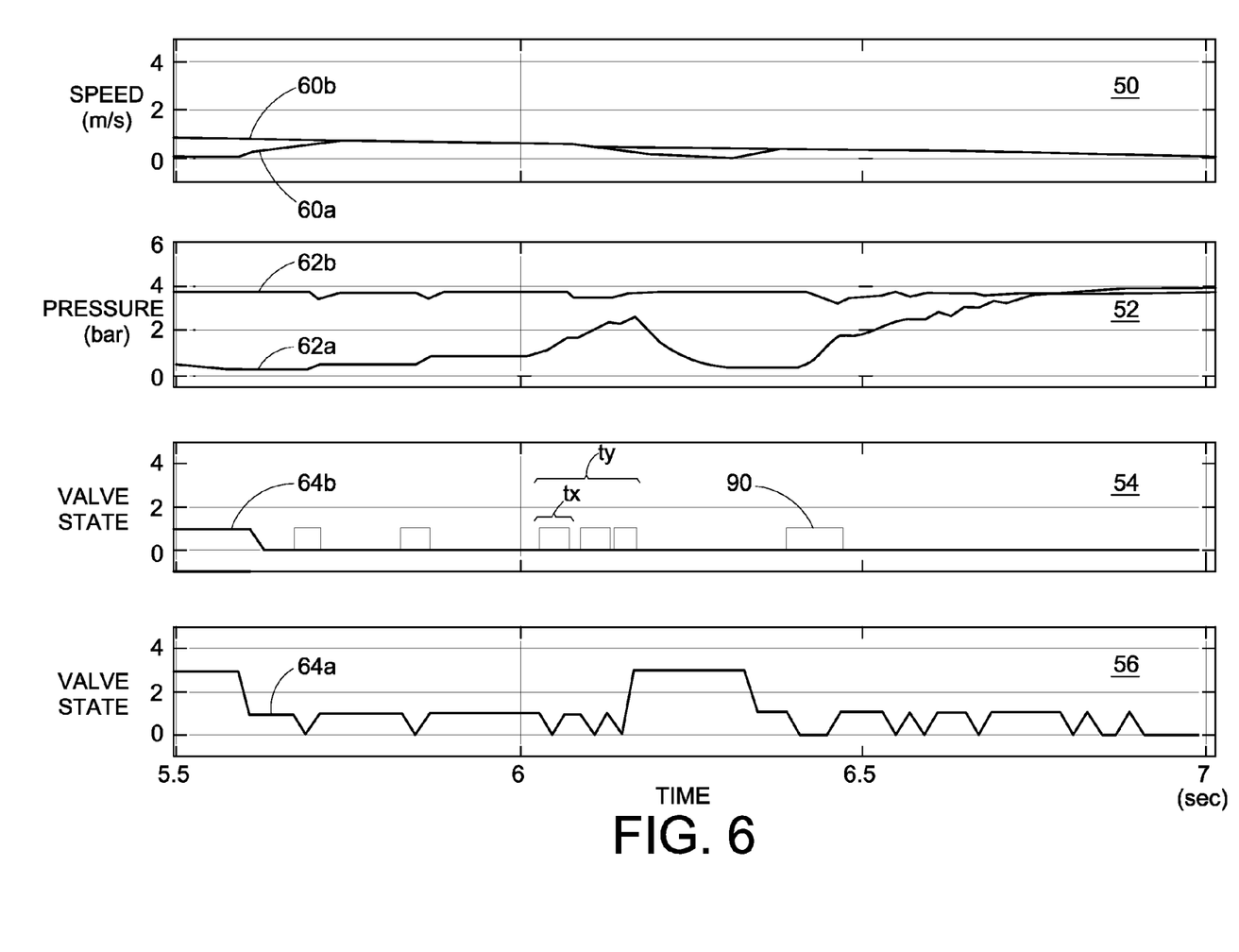
FIG. 6 illustrates enlarged portions of the various graphs shown in FIG. 4.

FIG. 6, illustrates an enlarged view of the graphs 50, 52, 54, 56 (see FIG. 4) between about 5.5 seconds and about 7.0 seconds). As noted above, the dotted line 90 in the graph 54 represents the states of the second valve 22b, and the graph 56 illustrates the states of the first valve 22a. As illustrated during the time period $t_x$, the second valve 22a is set to hold (see the step 230 in FIG. 2) and then the first valve 22a is substantially immediately set to the apply state (see the step 232 in FIG. 2). The first valve 22a is then set from the apply state to the hold state (see the step 234 in FIG. 2) and then the second valve 22b is substantially immediately set to the apply state (see the step 236 in FIG. 2). Therefore, the first valve 22a and the second valve 22b switch states substantially immediately after each other.

The optional times (e.g., 50 ms) between the steps 230 and 232 and between the steps 234 and 236 may act to reduce the number of times the second valve 22b switches between states. For example, in FIG. 5 the optional times are incorporated between the steps 230 and 232 and between the steps 234 and 236. While the second valve 22b switches to the hold state three (3) times during a time period $t_y$ in FIG. 4, which does not include the optional times between the steps 230 and 232 and between the steps 234 and 236, the second valve 22b switches to the hold state only one time during the time period $t_y$ in FIG. 5, Therefore, optional times between the steps 230 and 232 and between the steps 234 and 236 are expected to result in less wear on the second valve 22b and, in addition, capture more pressure at the second chamber 14b.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller controlling respective braking pressures at wheels on a vehicle, the controller comprising:

a processor electrically communicating with a first switching valve used in a pneumatic braking system on the vehicle, the first switching valve controlling a pneumatic fluid in a first brake chamber for controlling a first of the braking pressures at a first of the wheels, and a second switching valve used in the pneumatic braking system, the second switching valve controlling the pneumatic fluid in a second brake chamber for controlling a second of the braking pressures at a second of the wheels, the processor, during a braking control event, controlling one of the first and second switching valves associated with the higher of the first and second braking pressures to preserve the pneumatic fluid in the respective one of the first and second brake chambers and maintain the higher braking pressure before switching a state of the other switching valve associated with the lower of the braking pressures to increase the pneumatic fluid in the other of the brake chambers and increase the lower braking pressure.

2. The controller as set forth in claim 1, wherein the first switching valve is associated with the lower braking pressure and the second switching valve is associated with the higher braking pressure:
the processor transmits a signal to set the second switching valve to a hold state if the processor determines to increase the braking pressure at the first wheel during the braking control event.

3. The controller as set forth in claim 2, wherein:
the first wheel and the second wheel are included in a common brake circuit.

4. The controller as set forth in claim 2, wherein:
the first switching valve is in one of a hold state and a release state while the second switching valve is set to the hold state; and
the processor maintains the second switching valve in the hold state while the first switching valve is set from the one of the hold state and the release state to an apply state.

5. The controller as set forth in claim 2, wherein:
while the second switching valve is in the hold state, the processor transmits a signal to set the first switching valve to an apply state.

6. The controller as set forth in claim 5, wherein:
the processor transmits the signal to set the first switching valve to the apply state up to about 50 ms after transmitting the signal to set the second switching valve to the hold state.

7. The controller as set forth in claim 5, wherein:
while the second switching valve is in the hold state, the processor transmits a signal to set the first switching valve from the apply state to one of a hold state and a release state.

8. The controller as set forth in claim 7, wherein:
while the first switching valve is in the one of the hold state and the release state, the processor transmits a signal to set the second switching valve from the hold state to an apply state.

9. The controller as set forth in claim 8, wherein:
the processor transmits the signal to set the second switching valve from the hold state to the apply state up to about 50 ms after transmitting the signal to set the first switching valve to the one of the hold state and the release state.

10. The controller as set forth in claim 2, wherein:
the respective signals transmitted from the processor to the first switching valve and the second switching valve are transmitted via a vehicle communication bus.

11. The controller as set forth in claim 1, wherein:
the processor controls the one of the first and second switching valves associated with the higher of the first and second braking pressures during the braking control event only if a pressure difference between the first and second braking pressures is greater than a predetermined threshold pressure.

12. The controller as set forth in claim 11, wherein:
the predetermined threshold pressure is about 1 bar.

13. A vehicle braking system, comprising:
a pneumatic brake circuit including:
a first brake chamber associated with a first brake and a first wheel and a second brake chamber associated with a second brake and a second wheel;
a first switching valve associated with the first brake chamber; and
a second switching valve associated with the second brake chamber; and
a braking controller controlling respective braking pressures in the first and second brake chambers, the braking controller comprising:
a processor electrically communicating with the first switching valve, which controls a pneumatic fluid in the first brake chamber for controlling the first of the braking pressures at the first wheel, and the second switching valve, which controls the pneumatic fluid in the second brake chamber for controlling the second of the braking pressures at the second wheel, the processor controlling one of the first and second switching valves associated with the higher of the first and second braking pressures, during a braking control event, to preserve the pneumatic fluid in the respective one of the first and second brake chambers and maintain the higher braking pressure before switching a state of the other switching valve associated with the lower of the braking pressures to increase the pneumatic fluid in the other of the brake chambers and increase the lower braking pressure.

14. The vehicle braking system as set forth in claim 13, wherein:
the processor maintains the higher braking pressure by switching the switching valve associated with the higher braking pressure to a hold state before switching the switching valve associated with the lower pressure to an apply state.

15. The vehicle braking system as set forth in claim 13, wherein:
the processor transmits a signal to set the switching valve associated with the higher braking pressure to a hold state up to about 50 ms before transmitting a signal to set the switching valve associated with the lower braking pressure to the apply state.

16. The vehicle braking system as set forth in claim 15, wherein:
after transmitting the signal to set the switching valve associated with the lower braking pressure to the apply state, the processor transmits a signal to set the switching valve associated with the lower braking pressure to one of a hold state and a release state.

17. The vehicle braking system as set forth in claim 16, wherein:
after transmitting the signal to set the switching valve associated with the lower braking pressure to the one of the hold state and the release state, the processor transmits a signal to set the switching valve associated with the higher pressure to the apply state up to about 50 ms after transmitting the signal to set the switching valve associated with the lower braking pressure to the one of the hold state and the release state.

18. The vehicle braking system as set forth in claim 13, wherein:
the processor controls the switching valve associated with the higher of the braking pressures, during the braking control event, if a braking pressure difference between the first and second brakes is greater than a predetermined threshold pressure.

19. The vehicle braking system as set forth in claim 13, wherein the predetermined threshold pressure is about 1 bar.

20. A method for controlling respective pneumatic braking pressures at wheels in a common braking circuit on a vehicle, the method comprising:
determining if a braking control event is active;
if the braking control event is active, the method including:
identifying one of the wheels associated with a higher pneumatic braking pressure and one of the wheels associated with a lower pneumatic braking pressure; and
maintaining the pneumatic braking pressure in a brake chamber associated with the wheel associated with the higher pneumatic braking pressure before increasing the pneumatic braking pressure in a brake chamber associated with the wheel associated with the lower pneumatic braking pressure.

21. The method for controlling respective pneumatic braking pressures at wheels on a vehicle as set forth in claim 20, wherein the maintaining step includes:
setting a switching valve associated with the wheel having the higher pneumatic braking pressure to a hold state.

22. The method for controlling respective pneumatic braking pressures at wheels on a vehicle as set forth in claim 21, wherein the maintaining step further includes:
setting a switching valve associated with the lower pneumatic braking pressure from one of a hold state and a release state to an apply state.

23. The method for controlling respective pneumatic braking pressures at wheels on a vehicle as set forth in claim 22, wherein the maintaining step further includes:
setting the switching valve associated with the lower pneumatic braking pressure from the apply state to the one of the hold state and the release state.

24. The method for controlling respective pneumatic braking pressures at wheels on a vehicle as set forth in claim 23, wherein the maintaining step further includes:
setting the switching valve associated with the higher pneumatic braking from the hold state to the apply state.

25. The method for controlling respective pneumatic braking pressures at wheels on a vehicle as set forth in claim 24, wherein:
the step of setting the switching valve associated with the lower pneumatic braking pressure from one of a hold state and a release state to an apply state is performed up to about 50 ms before the step of setting the switching valve associated with the higher pneumatic braking pressure from the one of the hold state and the release state to the apply state; and
the step of setting the switching valve associated with the lower pneumatic braking pressure from the apply state to the one of the hold state and the release state is performed up to about 50 ms before the step of setting the switching valve associated with the higher pneumatic braking from the hold state to the apply state.

26. A controller controlling respective pneumatic braking pressures at wheels on a vehicle, the controller comprising:
first and second switching valves, associated with respective first and second pneumatic brake chambers that are associated with respective brakes at respective first and second ones of the wheels on the vehicle; and
a processor electrically communicating with the first switching valve, which controls a pneumatic fluid in the first brake chamber, and the second switching valve, which controls the pneumatic fluid in the second brake chamber, if a braking pressure difference between the first and second brakes is greater than a predetermined threshold pressure during a braking control event, the processor controlling the first switching valve and the second switching valve to increase the pneumatic fluid in the brake chamber associated with the lower braking pressure while maintaining the pneumatic fluid in the brake chamber associated with the higher braking pressure.

27. The controller controlling respective pneumatic braking pressures at wheels on a vehicle as set forth in claim 26, wherein:
the first and second brakes are associated with a common brake circuit.

28. The controller controlling respective pneumatic braking pressures at wheels on a vehicle as set forth in claim 26, wherein:
the processor causes the second switching valve to switch from an apply state to a hold state.

29. The controller controlling respective pneumatic braking pressures at wheels on a vehicle as set forth in claim 28, wherein:
the processor causes the first switching valve to switch from one of a hold state and a release state to an apply state; and then
the processor causes the first switching valve to switch from the apply state to one of the hold state and the release state; and then
the processor causes the second switching valve to switch from the hold state to the apply state.

30. The controller controlling respective pneumatic braking pressures at wheels on a vehicle as set forth in claim 29, wherein:
the processor causes the first switching valve to switch from one of the hold state and the release state to the apply state up to about 50 ms after the processor causes the second switching valve to switch from the apply state to the hold state; and
the processor causes the second switching valve to switch from the hold state to the apply state up to about 50 ms after the processor causes the first switching valve to switch from the apply state to one of the hold state and the release state.

31. A vehicle braking system, comprising:
a pneumatic brake circuit including a first brake chamber associated with a first brake and a first wheel and a second brake chamber associated with a second brake and a second wheel;
a first switching valve controlling a pneumatic fluid in the first brake chamber;
a second switching valve controlling the pneumatic fluid in the second brake chamber; and
means for maintaining a higher braking pressure at the second wheel while pressure increases at the first wheel during a braking control event.

32. The controller controlling respective braking pressures at wheels on a vehicle as set forth in claim 31, wherein:

the means for maintaining determines if a braking pressure difference between the first and second brakes is greater than a predetermined threshold pressure; and the means for maintaining maintains the higher braking pressure at the second wheel while pressure increases at the first wheel during a braking control event if the braking pressure difference between the first and second brakes is greater than the predetermined threshold pressure.

33. The controller controlling respective braking pressures at wheels on a vehicle as set forth in claim 31, wherein, if the higher braking pressure is at the second brake:

the means for maintaining switches the second switching valve to a hold state between about 50 ms before switching the first switching valve to an apply state;

the means for maintaining switches the first switching valve from the apply state to one of a hold state and a release state; and then the means for maintaining switches the second switching valve from the hold state to the apply state up to about 50 ms after the first switching valve is switched from the apply state to one of the hold state and the release state.

34. The controller as set forth in claim 1, wherein:

the pneumatic fluid is exhausted to atmosphere during the release state.

* * * * *